Figure 1:
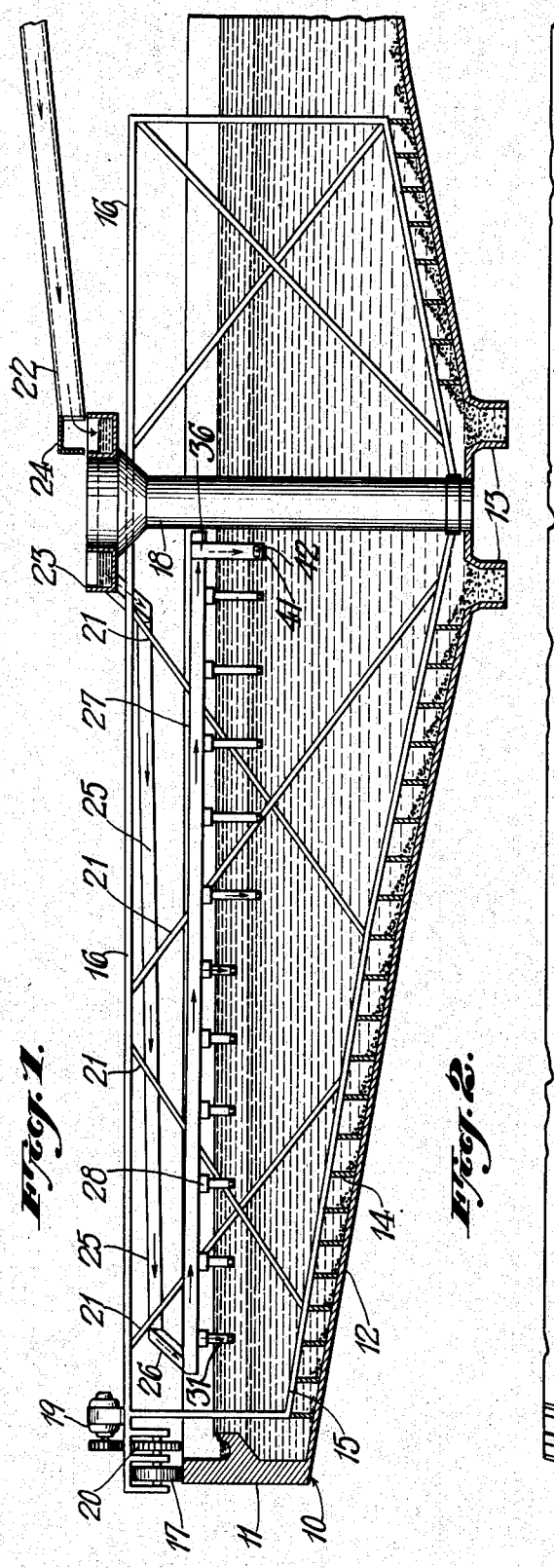

Dec. 23, 1941. H. F. ADAMS 2,267,516
THICKENER AND A METHOD OF CONCENTRATING OR THICKENING
SLIMES OF FINELY DIVIDED MATERIALS
Filed Dec. 15, 1938 2 Sheets-Sheet 1

INVENTOR.
HENRY F. ADAMS.
BY
Benj. T. Rauber ATTORNEY.

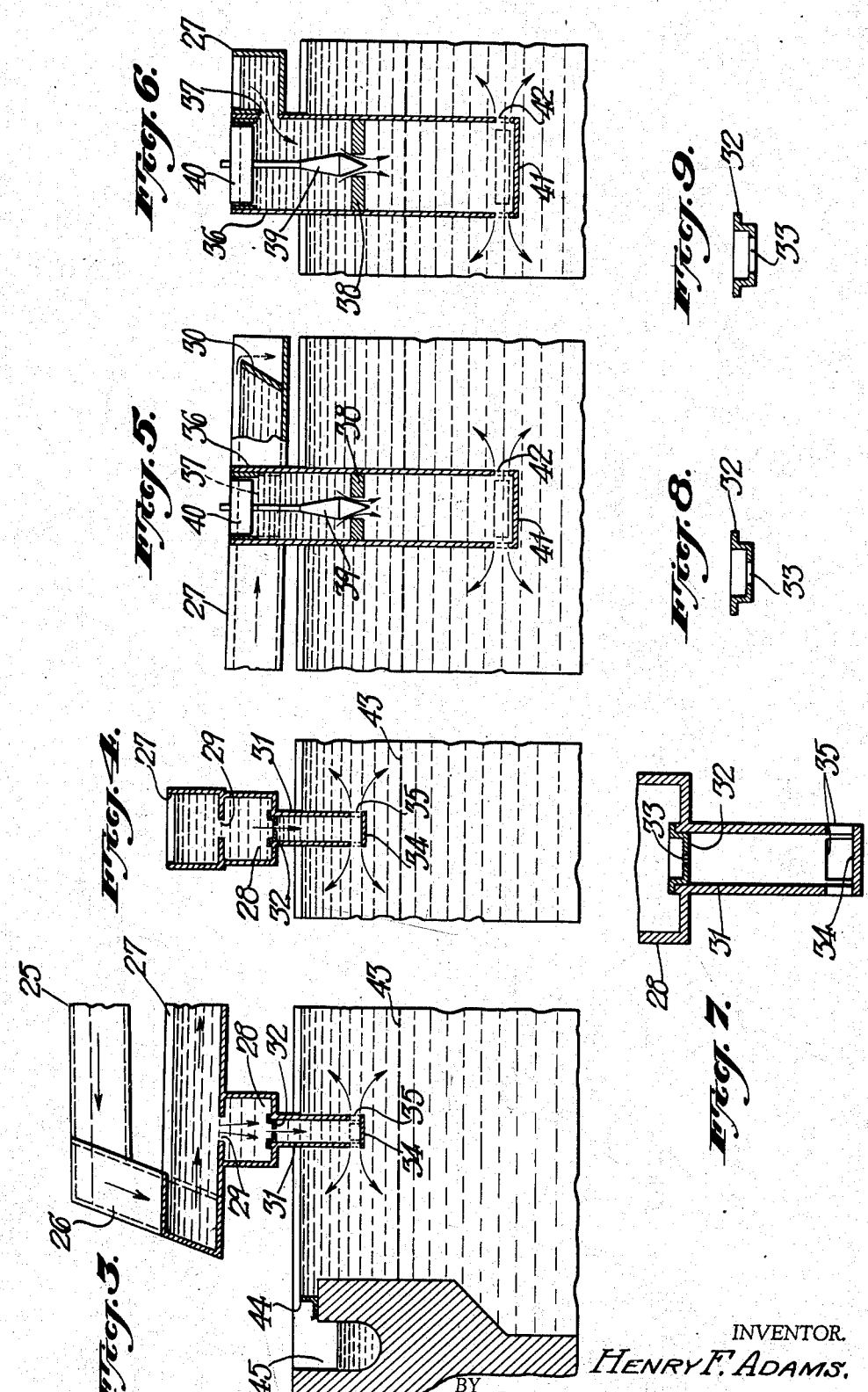

Patented Dec. 23, 1941

2,267,516

UNITED STATES PATENT OFFICE 2,267,516

THICKENER AND A METHOD OF CONCENTRATING OR THICKENING SLIMES OF FINELY DIVIDED MATERIALS

Henry F. Adams, Inspiration, Ariz.

Application December 15, 1938, Serial No. 245,828

5 Claims. (Cl. 210—55)

My invention relates to a process and apparatus for treating suspensions or slimes of finely divided material in a continuous manner to separate the suspended material from the liquid.

Apparatus heretofore commonly used for effecting such separation has generally comprised a circular shallow tank having a central bottom outlet for solids to which the bottom of the tank slopes gradually downwardly, and a peripheral overflow launder into which the water free from the separated solids overflows and is removed. To aid the movement of the solids that settle on the bottom of the tank, inwardly toward the central discharge opening, rakes are provided and so inclined that as they are moved about the tank they push the material slowly toward the center.

In apparatus of the above type the liquid containing the suspended solids to be separated has heretofore been introduced near the center by being allowed to cascade into the body of extremely thin pulp overlying the thicker pulp undergoing settlement. In thus pouring or cascading the incoming liquid into the tank it entrains bubbles of air beneath the surface of the liquid in the tank. This has a number of disadvantages notably in that it creates froth and moreover causes agitation.

Inasmuch as the rising bubbles of air create currents which tend to mix the partly separated particles with the overlying liquid from which they have been separated and thus interfere with the effectiveness of the separation, the foam formed in this way gathers on the surface of the thickener solution and gradually overflows with the solution going to the recovery tank or precipitating plant. In a countercurrent decantation process of separating liquids from solids, froth not only contaminates the liquid solution but it tends to form scale in the pipe lines and launders thus retarding the solution flow and adversely affecting the efficiency of the washing process.

In a thickener of the above type in which the incoming liquid is supplied near the center and the clarified liquid removed from the periphery, the finer sizes and colloidal material drift out toward the periphery and there form a column of pulp which is viscous and settles slowly. The coarser particles tend to settle rapidly at the center where they are introduced so that there is formed a body of slime or suspension near the periphery which is very slow in settling.

In my present invention I provide a process of handling the material to be classified in an apparatus whereby the liquid is supplied and introduced into the body of settling liquid in the classifier without entraining air or forming froth or foam and in which classification of material in the settling tank into a rapidly settling area or column of coarse particles and a slower settling of slime or finer and colloidal particles is avoided and the general average rate of settling is increased.

The various features of the invention are illustrated by way of example in the accompanying drawings in which—

Figure 2:
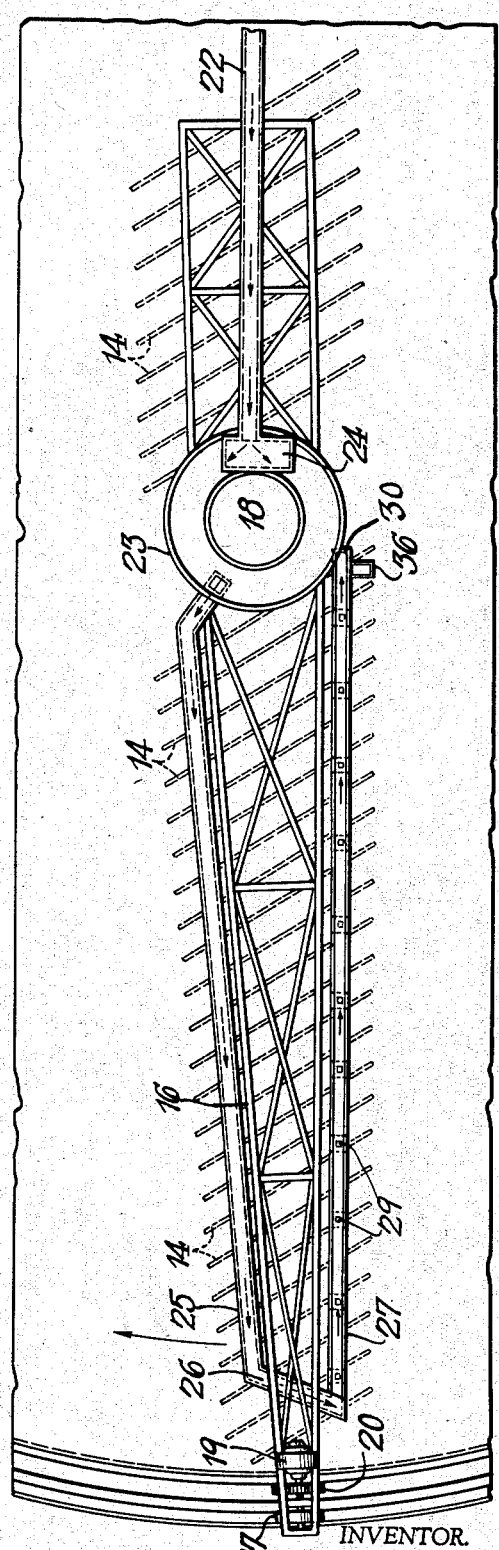

Fig. 1 is a vertical section of a part of a settling tank embodying a preferred form of the invention. Fig. 2 is a plan view of a part of the settling tank and distributing mechanism shown in Fig. 1. Fig. 3 is a vertical section through a part of the settling liquid and supply apparatus taken in a plane radial to the settling tank. Fig. 4 is a similar section taken at right angles to that of Fig. 3. Fig. 5 is a section similar to that of Fig. 3 of a distributing spout at the inner end of the supply apparatus. Fig. 6 is a section taken at a right angle to the plane of Fig. 5. Fig. 7 is a vertical section of a detail of the downspout. Figs. 8 and 9 are sections of removable control orifices.

In the accompanying drawings the invention is illustrated as applied to a thickener or classifier comprising a shallow tank 10 having an outer wall 11 and a bottom 12 sloping inwardly and downwardly from the peripheral wall 11 to central discharge outlets 13 for the separated solids.

The suspended solids in the liquid in the tank 10 settle on the bottom 12 and are scraped by blades 14 of a rake 15, the blades being so inclined and the rakes so rotated about the tank over the bottom 12 as to gradually push the separated material towards the center. The rake 15 is supported from a rotating arm 16 supported at its outer end on a wheel 17 that runs on the upper edge of the wall 11 and at its inner end on a central pier or pedestal 18. The wheel 17 may be rotated slowly by a motor 19 through suitable gearing 20 to cause it to roll on the peripheral wall 11 and thus rotate the rake, or the rake may be driven by any other suitable means. The rake 15 is suspended from the arm 16 by the arms 21. It will be understood that the rakes rotate slowly to gradually push the separated material toward the center with a minimum of agitation of the liquid itself.

In my invention as applied to the above settling or classifying tank, the liquid is supplied through a stationary launder 22 to a rotating central launder 23 on the top of the pier or pedestal 18 and rotating with the rake supporting arm 16. The feed from the launder 22 passes to the circular launder 23 through a suitable distributing box 24. From the circular launder 23 the feed then flows through a radial launder 25 carried by the rake supporting structure and extending from the bottom of the launder 23 outwardly toward the periphery of the tank and thence downwardly through a connecting launder 26 to a return radial launder 27 from which it is distributed to the body of liquid within the settling tank.

From the launder 27 the feed liquid is supplied to the settling tank in such a way as to avoid entrainment of air and as to distribute the coarser particles toward the peripheral part of the settling tank in such a manner as to entrain and carry downwardly the finer or colloidal particles in suspension in the tank while the finer particles are introduced at a lower level nearer the center so as to be entrained and carried downwardly by the coarser particles settling near the center.

For this purpose the return launder 27 is provided with a number of sumps 28 at spaced intervals immediately below the launder 27 to receive liquid through orifices 29 in the latter, as shown in Fig. 3. The launder 27 is provided near its inner end with an overflow dam 30, as shown in Fig. 5, to maintain a level of liquid in the launder 27 so long as the latter is in operation and, therefore, to keep the orifices or openings 29 submerged.

Feed material supplied to the outer end of the launder 27 by the distributing launder or pipe 25 gradually and slowly flows toward the inner end while in the meantime portions of it settle into the respective spaced sumps 28. From the bottom of each sump 28 there depends a downspout 31 into which the feed flows or settles from the sump 28. The rate of feed of the material from the sump 28 into the downspout 31 may be controlled by a removable orifice plate 32 having an orifice 33 of selected size, as shown in Fig. 7. Figs. 8 and 9 illustrate orifice plates having different and larger sized orifices.

The downspout 31 is closed at its lower end by a bottom plate 34, but is provided with side orifices 35, Figs. 3, 4 and 7, through which the feed may flow sidewise into the liquid in the separating tank with a minimum of disturbance thereto. The downspouts 31 and sumps 28 are all of substantially the same construction, but those nearer the center of the settling tank extend deeper into the liquid in the tank 10.

At the end of the launder 27 and between the end downspout 31 and the overflow dam 30, a downspout 36 is provided at one side of the launder 27 and communicating therewith through an orifice 37 near the bottom and which is, therefore, submerged in the feed liquid. The feed entering the upper part of the downspout 36 flows through a valve plate 38 which is controlled by a valve 39 depending from a float 40. In the event that the liquid level in the launder 27 should fall, the valve 39 would close against the valve plate 38 and thus decrease the outflow of liquid. If, however, the level of the liquid in the launder 27 should tend to rise the float 40 will open the valve 39 to permit greater outflow of liquid. The lower part of the downspout 36 is closed by a bottom plate 41 but is provided with side outlets 42 similar to those of the downspouts 31.

In the operation of the method and apparatus, the feed supplied through the launder 22 to the circular launder 23 flows outwardly through the delivery pipes 25 and 26 to the end of the launder 27 near the periphery of the tank, thence it flows inwardly toward the center of the tank. During the flow of material in the launder 27 there is a progressive settling of suspended material, the heavier or coarser particles settling first and the lighter or finer particles settling later. Consequently, the coarser particles settle into the sumps 28 and downspouts 31 nearer the outer end of the launder leaving the finer particles to enter the sumps and downspouts nearer the center. There is, therefore, a delivery of the coarser particles near the periphery, and progressively finer particles toward the center. The coarser particles settle more rapidly and tend to carry with them the finer suspended or colloidal material. The downspouts nearer the outer end of the launder 27, therefore, deliver below the surface of liquid in the tank and above the slime level, which is indicated approximately by the line 43. As the heavier particles settle into the slime below the line 43 they tend to carry downwardly the colloidal and slow settling particles.

The feed delivered through the downspouts nearer the center contain the colloidal and slower settling solid material. They, therefore, deliver below the slime level so that the efficiency of settling is increased by the materials above them in the slime.

As a result of the above arrangement the feed liquid is delivered below the liquid level in the tank with the coarser particles delivered above the slime level and the finer more slowly settling particles or suspended material being delivered at lower levels and nearer the center. The clarified liquid overflows the upper edge of a weir ring 44 into a peripheral launder 45 on the inner surface of the tank wall 11 from which it is withdrawn through a suitable outlet.

While the invention has been illustrated as applied to a specific type of thickener, it will be understood that it can be applied to similar thickeners and that it is not necessary to have a rotating radial launder. The invention provides a flexible method of introducing feed to a thickener in such a manner as to eliminate areas of slow settling material and to provide for a higher average settling efficiency.

Various modifications may be made by those skilled in the art without departing from the invention as defined in the appended claims.

What I claim is:

1. A method of separating suspended materials from a liquid which comprises classifying said liquid into parts of more rapidly settling and less rapidly settling material and introducing the more rapidly settling material into the upper part and the less rapidly settling material into the lower part of a body of liquid in which said suspended materials are being settled.

2. A method of separating suspended materials from a liquid which comprises maintaining a body of said liquid in which suspended material settles and is removed and from the upper part of which liquid is removed, introducing into said body at one level liquid having more rapidly settling material and at a lower level liquid having less rapidly settling material.

3. Apparatus of the type described which comprises a settling tank having a central sludge outlet and a peripheral overflow for clarifying liquid and a conduit for feed liquid extending over said settling tank toward the center thereof and rotatable about said center and having delivery spouts extending downwardly at intervals into said tank, the delivery spouts nearer the center of said tank extending deeper thereinto than the delivery spouts nearer the periphery and means for supplying feed liquid to said conduit near its outer end.

4. A settling tank having a peripheral overflow and a central sludge discharge and a radial distributor rotatable about a center in said tank and comprising a supply channel extending outwardly from the central part to the peripheral part of said tank and a distributing channel extending inwardly from the outer end of said supply channel, means to maintain the liquid in said distributing channel at a predetermined level and conduits at spaced intervals along said distributing channel to deliver into said tank below the liquid level in said tank and communicating with said distributing channel substantially below the liquid level in said channel.

5. A thickener having a peripheral overflow and a central sludge discharge, a radially extending distributing channel rotatable over said thickener, means to supply liquid and suspended material to the outer end of said distributing channel, a dam at the inner end of said distributing channel, a number of distributing spouts extending from a side of said channel to below the liquid level of said thickener and communicating with the lower part of said channel, control valves, one for each of said distributing spouts to control the flow of liquid therethrough to prevent the liquid level in said channel from falling and maintain it above its communications with said respective spouts.

HENRY F. ADAMS.